US008086847B2

(12) United States Patent
Singh

(10) Patent No.: US 8,086,847 B2
(45) Date of Patent: *Dec. 27, 2011

(54) COMPUTER PROGRAM PRODUCT AND COMPUTER SYSTEM FOR PEER-TO-PEER COMMUNICATIONS

(75) Inventor: Abhishek Singh, Gilles Plains (AU)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 12/502,175

(22) Filed: Jul. 13, 2009

(65) Prior Publication Data

US 2010/0023766 A1  Jan. 28, 2010

Related U.S. Application Data

(63) Continuation of application No. 10/937,051, filed on Sep. 9, 2004, now Pat. No. 7,596,690.

(51) Int. Cl.
*H04L 29/06* (2006.01)
(52) U.S. Cl. .................. 713/151; 713/155; 713/169
(58) Field of Classification Search .................. 713/151, 713/155, 169
See application file for complete search history.

(56) References Cited

U.S. PATENT DOCUMENTS

| 5,784,463 | A * | 7/1998 | Chen et al. ............... 713/171 |
| 6,061,796 | A | 5/2000 | Chen |
| 6,158,011 | A | 12/2000 | Chen |
| 6,584,566 | B1 | 6/2003 | Hardjono |
| 6,636,968 | B1 | 10/2003 | Rosner |
| 6,886,103 | B1 * | 4/2005 | Brustoloni et al. ............ 726/15 |
| 6,904,521 | B1 * | 6/2005 | Jivsov ........................... 713/155 |
| 7,120,691 | B2 | 10/2006 | Goodman |
| 7,127,613 | B2 * | 10/2006 | Pabla et al. ................... 713/171 |
| 7,130,999 | B2 | 10/2006 | Yasala |
| 7,181,620 | B1 | 2/2007 | Hur |
| 7,188,254 | B2 | 3/2007 | Somin |

(Continued)

FOREIGN PATENT DOCUMENTS

JP    P-2002-223209 A    8/2002

(Continued)

OTHER PUBLICATIONS

Stallings, William, "Cryptography and Network Security Principles and Practices Third Edition," 2004 Pearson Education Asia Limited and Publishing House of Electronics Industry, Beijing.

(Continued)

*Primary Examiner* — David Garcia Cervetti
(74) *Attorney, Agent, or Firm* — Anthony England; William Steinberg

(57) ABSTRACT

An encrypted request for peer-to-peer communication includes a requesting peer encrypting a requested peer identification using a public key of a security agent. The requesting peer sends the encrypted request to a security agent, which generates a first encrypted instance of the session key using a public key of the requested peer and a second encrypted instance of the session key using a public key of the requesting peer. The first encrypted instance of the session key is sent to the requested peer and the second encrypted instance of the session key is sent to the requesting peer. The requesting peer encrypts data using the second encrypted instance of the session key and sends the encrypted data to the requested peer, which decrypts the encrypted data using the first instance of the encrypted session key.

20 Claims, 4 Drawing Sheets

U.S. PATENT DOCUMENTS

| | | | |
|---|---|---|---|
| 7,222,187 B2 * | 5/2007 | Yeager et al. | 709/237 |
| 7,234,063 B1 | 6/2007 | Baugher | |
| 7,254,608 B2 * | 8/2007 | Yeager et al. | 709/203 |
| 7,299,356 B2 * | 11/2007 | Mizrah | 713/169 |
| 7,317,798 B2 * | 1/2008 | Saito | 380/277 |
| 7,328,243 B2 * | 2/2008 | Yeager et al. | 709/205 |
| 7,337,465 B2 * | 2/2008 | Kiyoto et al. | 726/1 |
| 7,366,892 B2 * | 4/2008 | Spaur et al. | 713/151 |
| 7,386,878 B2 * | 6/2008 | Fernando et al. | 726/3 |
| 7,403,980 B2 * | 7/2008 | Stringer-Calvert et al. | 709/220 |
| 7,506,161 B2 * | 3/2009 | Mizrah | 713/168 |
| 2002/0055989 A1 * | 5/2002 | Stringer-Calvert et al. | 709/220 |
| 2003/0028585 A1 * | 2/2003 | Yeager et al. | 709/201 |
| 2003/0070067 A1 * | 4/2003 | Saito | 713/150 |
| 2003/0163697 A1 * | 8/2003 | Pabla et al. | 713/171 |
| 2003/0188156 A1 | 10/2003 | Yasala | |
| 2004/0003247 A1 | 1/2004 | Fraser | |
| 2004/0034776 A1 * | 2/2004 | Fernando et al. | 713/171 |
| 2004/0054885 A1 | 3/2004 | Bartram | |
| 2004/0088348 A1 * | 5/2004 | Yeager et al. | 709/202 |
| 2004/0088646 A1 * | 5/2004 | Yeager et al. | 715/500 |
| 2004/0181689 A1 * | 9/2004 | Kiyoto et al. | 713/201 |
| 2004/0185842 A1 * | 9/2004 | Spaur et al. | 455/420 |
| 2005/0044411 A1 | 2/2005 | Somin | |
| 2005/0050323 A1 * | 3/2005 | Mizrah | 713/168 |
| 2005/0071481 A1 | 3/2005 | Danieli | |
| 2006/0053290 A1 | 3/2006 | Randle | |

FOREIGN PATENT DOCUMENTS

| | | |
|---|---|---|
| JP | P-2002-544712 A | 12/2002 |
| JP | P-2003-122635 A | 4/2003 |
| JP | P-2003-187101 A | 7/2003 |

OTHER PUBLICATIONS

Parameswaran, Manoj, Susarla Anjana, and Whinston B. Andrew "P2P Networking: An Information-Sharing Alternative" Computer, Jul. 2001, p. 31-37, IEEE Computer Society.

Larton, George "Is Peer-to-Peer Secure Enough for Corporate Use?", Computer, Jan. 2004, p. 22-25, IEEE Computer Society.

U.S. Appl. No. 10/937,051 Nonfinal Office Action Dated Nov. 2, 2007.

U.S. Appl. No. 10/937,051 Response to Nonfinal Offiice Action dated Feb. 20, 2008.

U.S. Appl. No. 10/937,051 Notice of Noncompliant Amendment dated Jun. 9, 2008.

U.S. Appl. No. 10/937,051 Response to Notice of Noncompliant Amendment dated Jul. 9, 2008.

U.S. Appl. No. 10/937,051 Nonfinal Office Action dated Oct. 27, 2008.

U.S. Appl. No. 10/937,051 Response to Nonfinal Office Action dated Jan. 27, 2009.

U.S. Appl. No. 10/937,051 Notice of Allowance dated May 14, 2009.

U.S. Appl. No. 10/937,051 Rule 312 Amendment dated May 14, 2009.

U.S. Appl. No. 10/937,051 Response to Rule 312 Amendment dated Jul. 29, 2009.

* cited by examiner

COMPUTER PROGRAM PRODUCT AND COMPUTER SYSTEM FOR PEER-TO-PEER COMMUNICATIONS

CROSS-REFERENCE TO RELATED APPLICATION

This application is a continuation of co-pending, prior application Ser. No. 10/937,051, filed on Sep. 9, 2004, which is incorporated herein by reference.

FIELD OF THE INVENTION

The present invention relates to peer-to-peer communications.

BACKGROUND OF THE INVENTION

The characterizing feature of peer-to-peer systems—namely a decentralized, distributed architecture—is also its weakest link. Security issues remain one of the primary blocks to the adoption of peer-to-peer systems beyond use with previously known and trusted partners, as many peer-to-peer applications require secure communication between peers.

A key issue in secure communication between peers is authentication of peers. Another issue is to establish a secure session by using a "fresh" secret session key. The notion of "freshness" is important to avoid the replay attack. A replay attack involves the interception of communications, and subsequently impersonation of the sender by retransmitting the intercepted communication. By using a "fresh" or new session key, impersonation by retransmission can be avoided.

Secure peer-to-peer communications can be implemented using techniques such as Secured Socket Layer (SSL), which is designed for communications between a server and clients. Secured Socket Layer technology can be applied to peer-to-peer communications, but is not intended for or particularly suited to secure communication between peers.

Accordingly, an improved approach to securing peer-to-peer communications is clearly required.

SUMMARY OF THE INVENTION

A computer program product for secure peer-to-peer communications includes a computer readable storage device having computer readable program code embodied therewith. The computer readable program code includes computer readable code configured to authenticate a requesting peer with a security agent; computer readable code configured to generate an encrypted request for peer-to-peer communication with a requested peer, wherein the request includes an identification of the requested peer and the generating of the request includes the requesting peer encrypting the requested peer identification, wherein the encrypting uses a public key of the security agent.

The computer readable program code includes computer readable code configured to send the encrypted, peer-to-peer communication request to the security agent from the requesting peer and computer readable code configured to authenticate the requested peer with the security agent.

The computer readable program code includes computer readable code configured to generate a session key by the security agent and computer readable code configured to generate a first encrypted instance of the session key by the security agent using a public key of the requested peer.

The computer readable program code includes computer readable code configured to generate a second encrypted instance of the session key by the security agent using a public key of the requesting peer and computer readable code configured to send the first encrypted instance of the session key by the security agent to the requested peer.

The computer readable program code includes computer readable code configured to send the second encrypted instance of the session key by the security agent to the requesting peer and computer readable code configured to encrypt data by the requesting peer using the second encrypted instance of the session key.

The computer readable program code includes computer readable code configured to send the encrypted data directly from the requesting peer to the requested peer and computer readable code configured to receive the encrypted data and decrypting the encrypted data by the requested peer, wherein the decrypting uses the first instance of the encrypted session key.

A computer system includes at least one storage system having a stored program and at least one processor, operable to process the program. The system is configured by the program and the processor to authenticate a requesting peer with a security agent and generate an encrypted request for peer-to-peer communication with a requested peer, wherein the request includes an identification of the requested peer and the generating of the request includes the requesting peer encrypting the requested peer identification, wherein the encrypting uses a public key of the security agent.

The system is configured by the program and the processor to send the encrypted, peer-to-peer communication request to the security agent from the requesting peer, authenticate the requested peer with the security agent, and generate a session key by the security agent.

The system is configured by the program and the processor to generate a first encrypted instance of the session key by the security agent using a public key of the requested peer and generate a second encrypted instance of the session key by the security agent using a public key of the requesting peer.

The system is configured by the program and the processor to send the first encrypted instance of the session key by the security agent to the requested peer and send the second encrypted instance of the session key by the security agent to the requesting peer.

The system is configured by the program and the processor to encrypt data by the requesting peer using the second encrypted instance of the session key, send the encrypted data directly from the requesting peer to the requested peer, and receive the encrypted data and decrypt the encrypted data by the requested peer, wherein the decrypting uses the first instance of the encrypted session key.

DETAILED DESCRIPTION OF THE INVENTION

Figure 1:
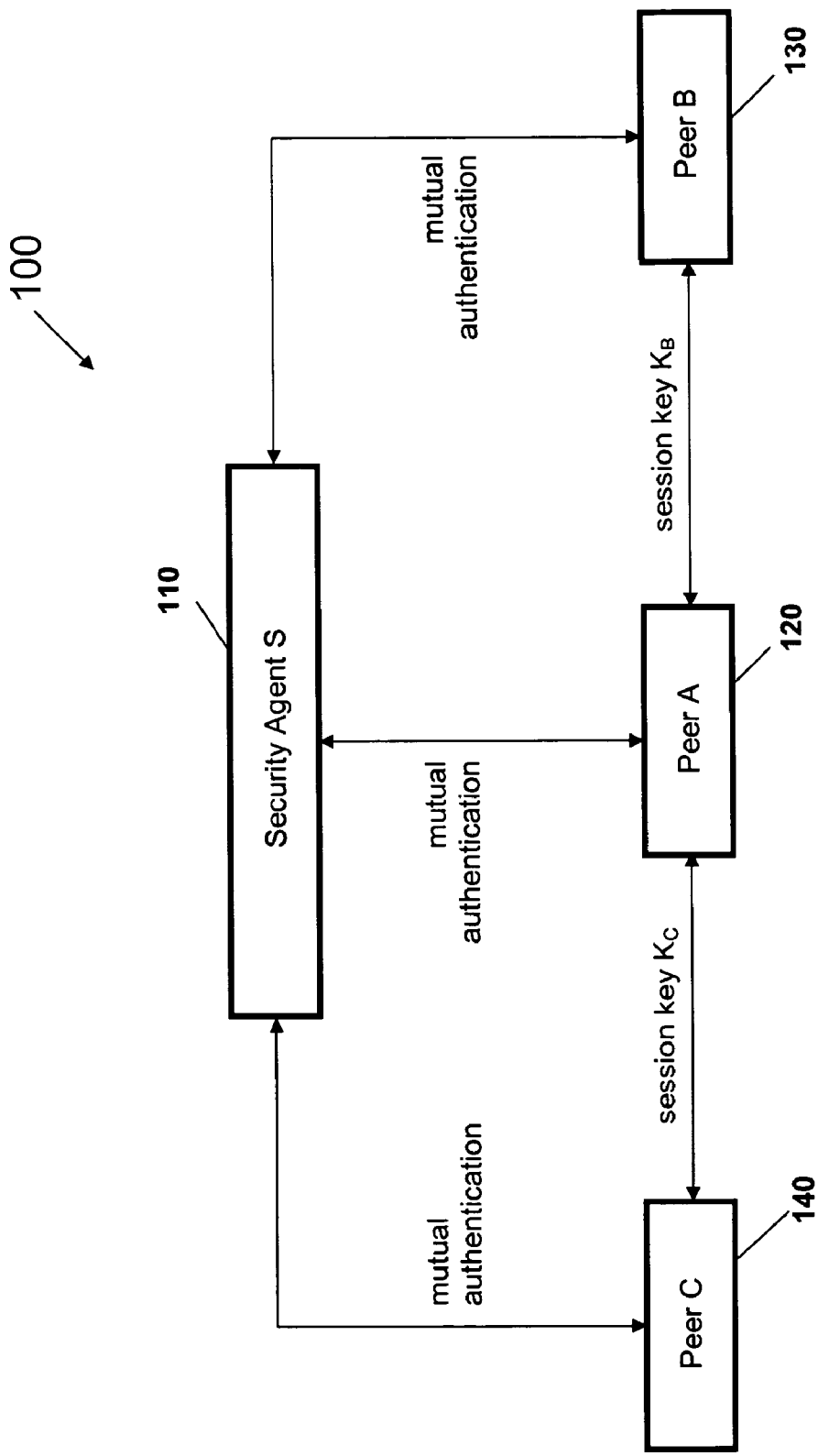
FIG. 1 is a schematic representation of the entities involved in the peer-to-peer communications protocol described herein.

FIG. 1 schematically represents entities involved in a peer-to-peer network 100, according to the protocol described herein. A Security Agent S 110 has communications links with Peer A 120, Peer B 130, and Peer C 140. The network 100 may include further peers, though three peers are sufficient to illustrate operation of the described security protocol.

The Security Agent S 110 is mutually authenticated with each of the Peers 120, 130, 140 during initial communication between the requesting Peer 120 and the Requested Peers 130 and 140.

Entities, Assumptions and Notation

Consider the following entities that are used in describing an arrangement for peer-to-peer communications.

Peer A 120 A client wanting to use the resources or services of Requested Peers B 130 and C 140.

Peer B 130 and C 140 Requested Peers B 130 and C 140 with which Requesting Peer A 120 communicates.

Security Agent S 110 An agent, cluster of "thick" clients or servers that facilitates secure communication between Requesting and Requested Peers.

The following assumptions, numbered below, also apply.

1. Peer A 120 determines which Requested Peer or Peers (Peer B 130 and Peer C 140 in this case) with which Peer A 120 wants to communicate, using any suitable peer discovery techniques.
2. All Peers are registered with the Security Agent S 110, and consequently have the public key of the Security Agent S 110 and vice versa.
3. All Peers and the Security Agent 110 have their own public/private key pair. A robust algorithm, such as RSA or similar, is assumed to generate the public/private key pair.

Notations used herein in relation to Peers A 120, B 130 and C 140 and the Security Agent S 110 are as follows.

A, B, C→Peers {A, B, C}

S→Security Agent $P_A, P_B, P_C, P_S$→Public key of the subscripted Peer A, B, C, or Security Agent S.

$P_A(\ )$→data within the braces is encrypted using Peer A's public key $n_{\{a, b, c, s1, s2, s3\}}$→Nonce, i.e., a message number distinguishable from other message numbers during a certain processing interval. (In one embodiment the nonce is a randomly generated, unique message number.)

$K_B, K_C$→Secret session key or symmetric key, such as $K_B$ is symmetric key to be used between Peer A and Peer B Communications Protocol Peer A 120 wants to communicate securely with Peers B 130 and C 140. Table 1 below outlines a sequence of steps that are involved in initiating secure communications between Peer A 120 and Peers B 130 and C 140.

TABLE 1

| Step | Interaction | Message Sent |
| --- | --- | --- |
| Step 1 | A → S | $P_S(n_a)$ |
| Step 2 | S → A | $P_A(n_a, n_{s1})$ |
| Step 3 | A → S | $P_S(n_{s1}, \text{Peers}\{B, C\})$ |
| Step 4 | S → B | $P_B(n_{s2})$ |
|  | S → C | $P_C(n_{s3})$ |
| Step 5 | B → S | $P_S(n_{s2}, n_b)$ |
|  | C → S | $P_S(n_{s3}, n_c)$ |
| Step 6 | S → B | $P_B(n_b, K_B)$ |
|  | S → C | $P_C(n_c, K_C)$ |
| Step 7 | S → A | $P_A(n_a, (\{\text{peer, key}\} \rightarrow (\{B, K_B\}, \{C, K_C\})))$ |
| Step 8 | A → B | $K_B(\text{data})$ |
|  | A → C | $K_C(\text{data})$ |

Steps 1 to 3 involve mutual authentication of the requesting peer, Peer A 120, and the Security Agent S 110.

Steps 4 to 6 involve events related to mutual authentication of Requested Peers B 130 and C 140 and the Security Agent S 110. Step 6 also involves distribution of corresponding secret symmetric keys.

Step 7 involves distribution of secret session keys to be used by Peer A 120 when communicating with Peers B 130 and C 140. As an example, $K_B$, $K_C$ are used by Peer A 120 to communicate with Peer B 130 and Peer C 140 respectively.

Step 8 involves requesting Peer A 120 to initiate a secure communication with Requested Peers B 130 and C 140.

Figure 2A:
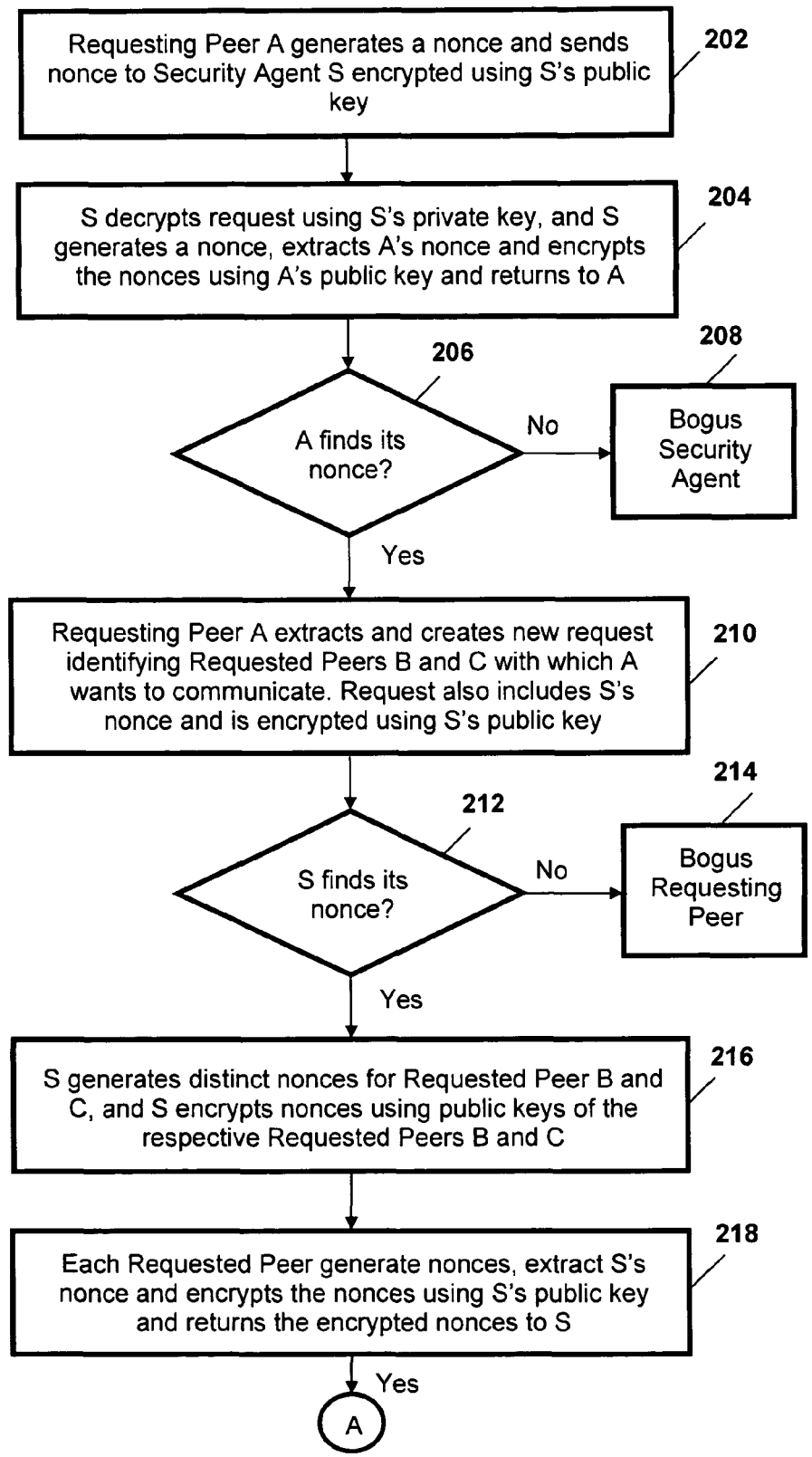
FIGS. 2A and 2B jointly form a flow chart of steps involved in establishing secure communications between peers in a peer-to-peer network.
Figure 2B:
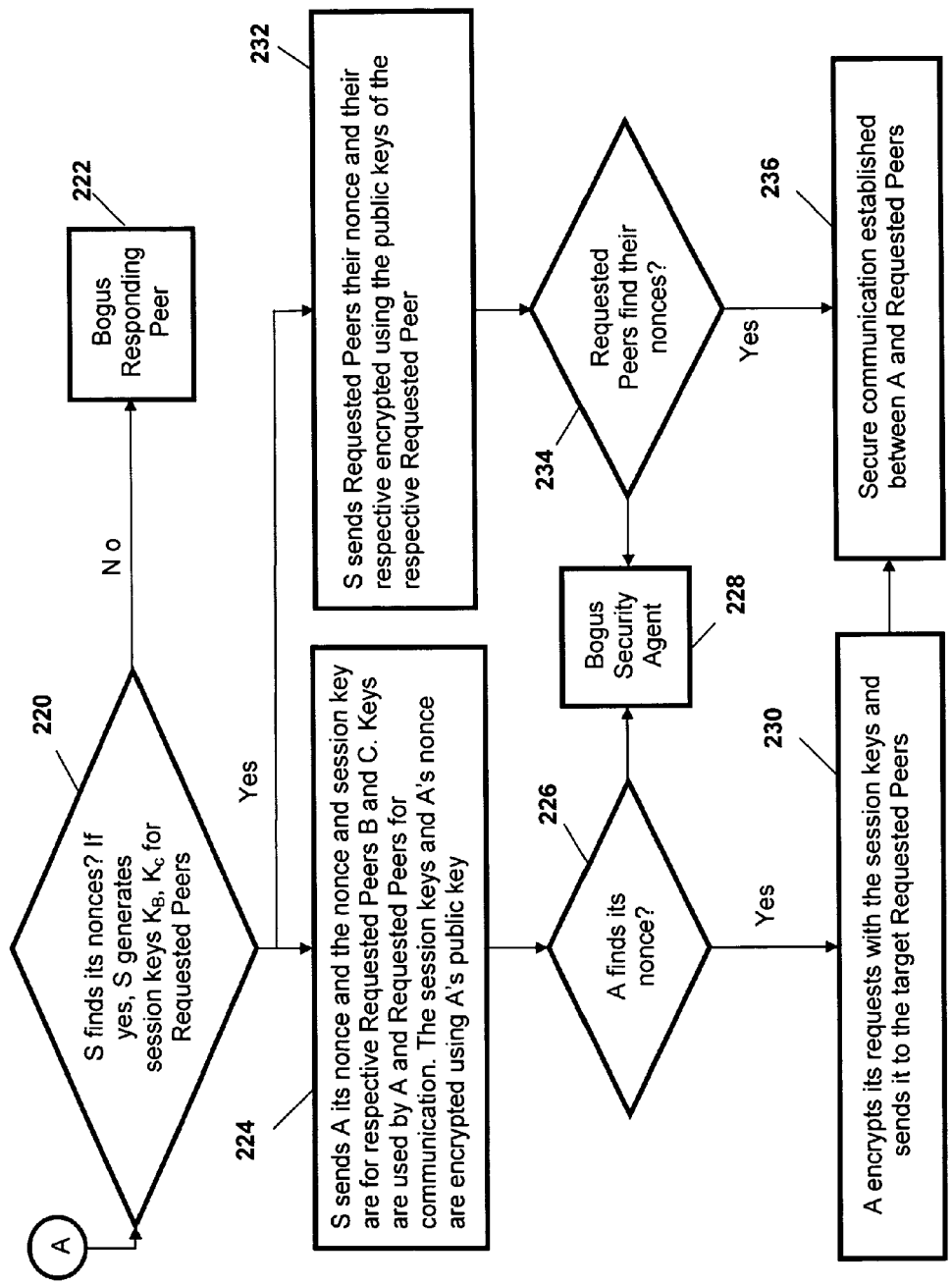

FIGS. 2A and 2B flow charts these steps in further detail. Requesting Peer A 120 generates a nonce, which Peer A 120 sends to Security Agent S 110 in step 202. The nonce is encrypted using the public key of Security Agent S 110. Security Agent S 110 decrypts the transmitted is nonce using the private key of Security Agent S 110 in step 204. In this step, Security Agent S 110 generates its own nonce, and encrypts the generated nonce (and the decrypted nonce from Peer A 120) using the public key of Peer A 120. The encrypted nonces are returned to Peer A 120.

Peer A 120 makes a determination in step 206 of whether the message sent from Security Agent S 110 in step 204 encrypts the nonce previously sent from Peer A 120 to Security Agent S 110. This determination is made by decrypting the message received from Security Agent S 110 using the private key of Peer A 120. The Security Agent S 110 is determined to be a bogus Security Agent in step 208 if Peer A 120 does not receive its nonce in reply. Otherwise, if Peer A 120 does receive its nonce, the Security Agent S 110 is deemed legitimate, and processing proceeds to step 210.

Peer A 120 extracts the nonce sent by the Security Agent S 110 in step 210, and creates a new request that specifies Peers B 130 and C 140 with which Peer A 120 wishes to communicate. The request includes the extracted nonce of the Security Agent S 110, Peer A 120 encrypts the new request using the public key of Security Agent S 110, and send the encrypted request to Security Agent S 110.

Security Agent S 110 receives the encrypted request from Peer A 120 in step 212, whereupon a determination is made of whether Security Agent S 110 has received the nonce Security Agent S 110 sent to Peer A 120 in step 204. Peer A 120 is determined in step 214 to be a bogus Requesting Peer if Security Agent S 110 does not receive its nonce in reply from Peer A 120. Otherwise, if Security Agent S 110 does receive its nonce in reply from Peer A 120, then Peer A 120 is deemed a legitimate Requesting Peer, and processing proceeds to step 216.

Security Agent S 110 generates in step 216 a distinct nonce for each Requested Peer with which Peer A 120 wishes to communicate, in this case Peers B 130 and C 140. Each of these nonces generated by Security Agent S 110 is encrypted using the public key of the respective Requested Peer, and transmitted to that Requested Peer specified by the Requesting Peer, Peer A 120. Each Requested Peer, Peers B 130 and C 140, generate their own nonces in step 218, and extract the nonce sent by Security Agent S 110 in step 216. These nonces form a reply sent to the Security Agent S 110, which is encrypted using the public key of the Security Agent S 110.

A determination is made in step 220 of whether Security Agent S 110 receives its nonce in reply in the message sent to Security Agent S 110 in step 218. If Security Agent S 110 does not receive its nonce in reply from a Requested Peer, that Requested Peer is determined to be a bogus Requested Peer in step 222. If each Requested Peer responds to the Security Agent S 110 with the nonce sent by the Security Agent S 110 in step 216, then each Requested Peer is deemed legitimate. In this case, Security Agent S 110 is mutually authenticated with the Requesting Peer, and with the Requested Peers. The Security Agent S 110 generates a session key for each Requested Peer, B 140 and C 130. Processing thus proceeds in parallel with steps 224 and 232.

The Security Agent S 110 sends a message to each Requested Peer containing that Peer's nonce and a session key ($K_B$ or $K_C$), encrypted using the Requested Peer's public key in step 232. The session key is used by the Requested Peer to communicate with Requesting Peer A 120.

Security Agent S 110 also sends the generated session keys ($K_B$ or $K_C$) to the Requesting Peer A 120 in step 224. The Security Agent S 110 sends the session keys and the Requesting Peer's nonce encrypted by the public key of Requesting Peer A 120.

A determination is made in step 226 of whether Peer A 120 receives its nonce from the Security Agent S 110. If Peer A 120 does not receive its nonce, then the Security Agent S 110 is deemed to be a bogus Security Agent, on step 228. Otherwise, the Security Agent S 110 is deemed legitimate, and processing proceeds to step 230. Peer A 120 encrypts its requests (such as file downloads, or job executions) with the session keys used for communication between Peer A 120 and Peer B 140, and Peer A 120 and Peer C 130 respectively, and sends the requests to the corresponding Requested Peers in step 230. Secure communications are established between Requesting Peer A 120 and Requested Peer B 140, and Peer A 120 and requested Peer C 130, in step 238.

A determination is made in step 234 of whether the Requested Peer 130, 140 receives its nonce in reply from the Security Agent S 110. If the Requested Peer does not receives its nonce, Security Agent S 110 is deemed to be a bogus Security Agent in step 228. Otherwise, Security Agent S 110 is deemed to be legitimate, and secure communications are established between peers in step 238, initiated by step 230.

Computer Hardware

Figure 3:
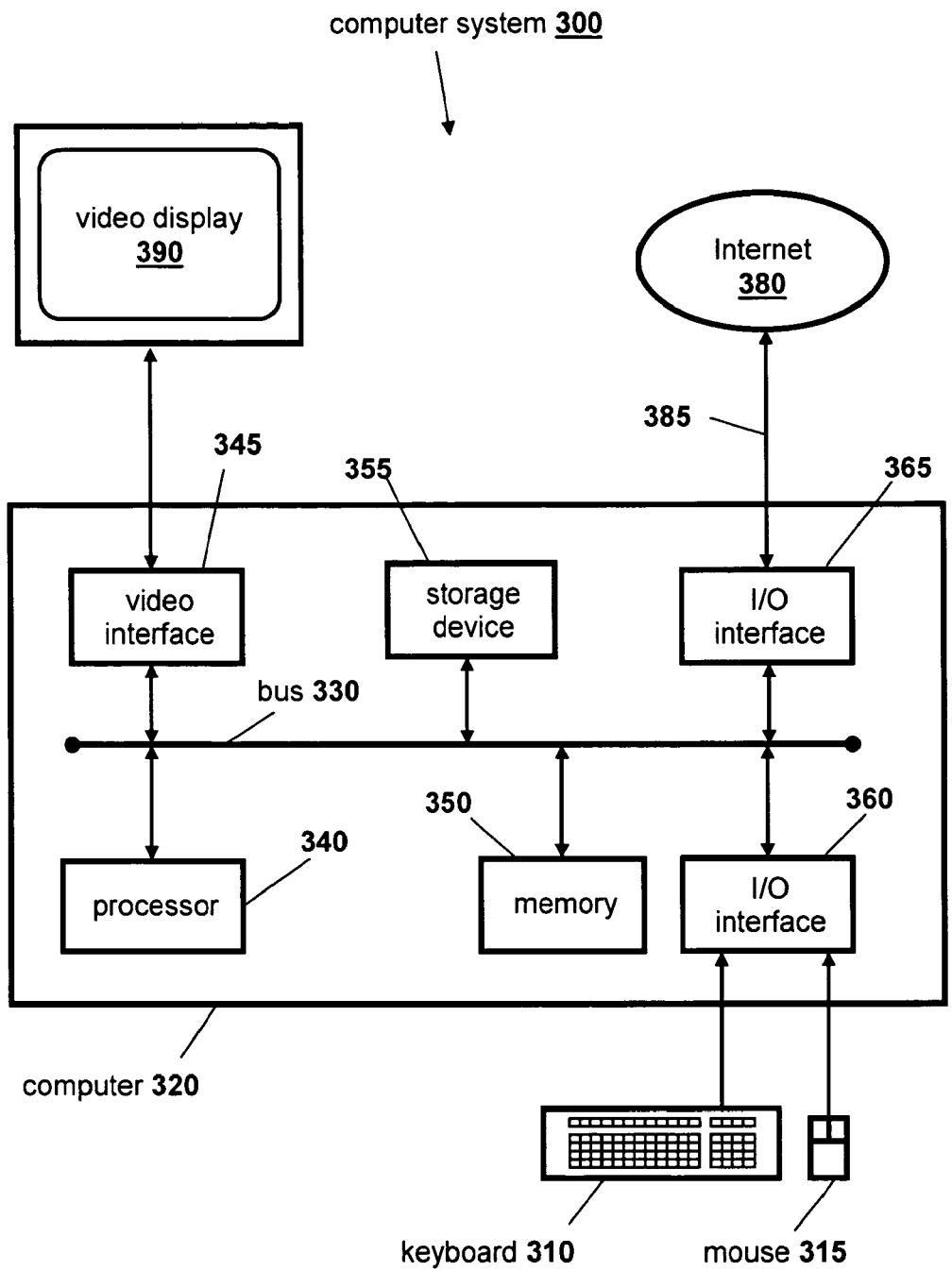
FIG. 3 is a schematic representation of a computer system of a type suitable use in a peer-to-peer network.

FIG. 3 is a schematic representation of a computer system 300 of a type that is suitable for acting as a Peer 120, 130 or 140 or Security Agent S 110 in a peer-to-peer network of FIG. 1. Computer software executes under a suitable operating system installed on the computer system 300, and may be thought of as comprising various software code means for achieving particular steps. The Security Agent S 110 can be implemented to cater for anticipated loads in a single server, or in a cluster of servers. A cluster of "thick" clients can also be used to cater for anticipated loads.

The components of the computer system 300 include a computer 320, a keyboard 310 and mouse 315, and a video display 390. The computer 320 includes a processor 340, a memory 350, input/output (I/O) interfaces 360, 365, a video interface 345, and a storage device 355.

The processor 340 is a central processing unit (CPU) that executes the operating system and the computer software executing under the operating system. The memory 350 includes random access memory (RAM) and read-only memory (ROM), and is used under direction of the processor 340.

The video interface 345 is connected to video display 390 and provides video signals for display on the video display 390. User input to operate the computer 320 is provided from the keyboard 310 and mouse 315. The storage device 355 can include a disk drive or any other suitable storage medium.

Each of the components of the computer 320 is connected to an internal bus 330 that includes data, address, and control buses, to allow components of the computer 320 to communicate with each other via the bus 330.

The computer system 300 can be connected to one or more other similar computers via a input/output (I/O) interface 365 using a communication channel 385 to a network, represented as the Internet 380.

The computer software may be recorded on a portable storage medium, in which case, the computer software program is accessed by the computer system 300 from the storage device 355. Alternatively, the computer software can be accessed directly from the Internet 380 by the computer 320. In either case, a user can interact with the computer system 300 using the keyboard 310 and mouse 315 to operate the programmed computer software executing on the computer 320.

Other configurations or types of computer systems can be equally well used to execute computer software that assists in implementing the techniques described herein. Various alterations and modifications can be made to the techniques and arrangements described herein, as would be apparent to one skilled in the relevant art.

What is claimed is:

1. A computer program product for secure peer-to-peer communications, the program product comprising:
a computer readable storage device having computer readable program code embodied therewith, the computer readable program code comprising:
computer readable code configured to authenticate a requesting peer with a security agent;
computer readable code configured to generate an encrypted request for peer-to-peer communication with a requested peer, wherein the request includes an identification of the requested peer and the generating of the request includes the requesting peer encrypting the requested peer identification, wherein the encrypting uses a public key of the security agent;
computer readable code configured to send the encrypted, peer-to-peer communication request to the security agent from the requesting peer;
computer readable code configured to authenticate the requested peer with the security agent;
computer readable code configured to generate a session key by the security agent;
computer readable code configured to generate a first encrypted instance of the session key by the security agent using a public key of the requested peer;
computer readable code configured to generate a second encrypted instance of the session key by the security agent using a public key of the requesting peer;
computer readable code configured to send the first encrypted instance of the session key by the security agent to the requested peer;
computer readable code configured to send the second encrypted instance of the session key by the security agent to the requesting peer;
computer readable code configured to encrypt data by the requesting peer using the second encrypted instance of the session key;
computer readable code configured to send the encrypted data directly from the requesting peer to the requested peer; and
computer readable code configured to receive the encrypted data and decrypting the encrypted data by the requested peer, wherein the decrypting uses the first instance of the encrypted session key.

2. The computer program product of 1, wherein the authenticating of a requesting peer with a security agent is included in a mutual authentication of the requesting peer and the security agent, and wherein the sending of the encrypted request for peer-to-peer communication with a requested peer that includes an identification of the requested peer occurs during the mutual authentication.

3. The computer program product of 1, wherein the computer program product comprises computer readable code configured to mutually authenticate the requested peer and the security agent, and wherein the sending of the first encrypted instance of the session key by the security agent to the requested peer occurs during the mutual authentication of the requested peer and the security agent.

4. The computer program product of 1, wherein the computer program product comprises computer readable code configured to generate a message number at the requesting peer.

5. The computer program product of 1, wherein the computer program product comprises computer readable code configured to generate a message number at the requested peer.

6. The computer program product of 1, wherein the computer program product comprises computer readable code configured to generate message numbers at the security agent for the requesting peer and the requested peer.

7. The computer program product of 1, wherein the computer readable code configured to generate an encrypted request for peer-to-peer communication with a requested peer includes computer readable code configured to generate requests for a requesting peer to communicate with a number of requested peers and wherein the computer program product comprises computer readable code configured to distribute the encrypted session key to all of the requested peers.

8. The computer program product of 1, wherein the computer program product comprises computer readable code configured to authenticate the security agent with the requesting peer.

9. The computer program product of 1, wherein the computer program product comprises computer readable code configured to authenticate the security agent with the requested peer.

10. The computer program product of 1, wherein the computer readable code configured to generate an encrypted request for peer-to-peer communication with a requested peer includes computer readable code configured to generate requests for requesting a peer to communicate with a number of requested peers and wherein the computer program product comprises computer readable code configured to distribute different encrypted session keys to the respective requested peers.

11. A computer system comprising:
at least one storage system having a stored program; and
at least one processor, operable to process the program, wherein the system is configured by the program and the processor to:
authenticate a requesting peer with a security agent;
generate an encrypted request for peer-to-peer communication with a requested peer, wherein the request includes an identification of the requested peer and the generating of the request includes the requesting peer encrypting the requested peer identification, wherein the encrypting uses a public key of the security agent;
send the encrypted, peer-to-peer communication request to the security agent from the requesting peer;
authenticate the requested peer with the security agent;
generate a session key by the security agent;
generate a first encrypted instance of the session key by the security agent using a public key of the requested peer;
generate a second encrypted instance of the session key by the security agent using a public key of the requesting peer;
send the first encrypted instance of the session key by the security agent to the requested peer;
send the second encrypted instance of the session key by the security agent to the requesting peer;
encrypt data by the requesting peer using the second encrypted instance of the session key;
send the encrypted data directly from the requesting peer to the requested peer; and
receiving the encrypted data and decrypting the encrypted data by the requested peer, wherein the decrypting uses the first instance of the encrypted session key.

12. The computer system of claim 11, wherein the authenticating of a requesting peer with a security agent is part of a process of mutual authentication of the requesting peer and the security agent, and wherein the sending of the encrypted request for peer-to-peer communication with a requested peer that includes an identification of the requested peer occurs during the mutual authentication process.

13. The computer system of claim 11, wherein the authenticating includes mutual authentication of the requested peer and the security agent, and wherein the sending of the first encrypted instance of the session key by the security agent to the requested peer occurs during the mutual authentication of the requested peer and the security agent.

14. The computer system of claim 11, wherein the system is configured by the program and the processor to:
generate a message number at the requesting peer.

15. The computer system of claim 11, wherein the system is configured by the program and the processor to:
generate a message number at the requested peer.

16. The computer system of claim 11, wherein the system is configured by the program and the processor to:
generate message numbers at the security agent for the requesting peer and the requested peer.

17. The method as claimed in claim 11, wherein the generating of an encrypted request for peer-to-peer communication with a requested peer includes generating requests for a requesting peer to communicate with a number of requested peers and the encrypted session key is distributed to all of the requested peers.

18. The computer system of claim 11, wherein the system is configured by the program and the processor to:
authenticate the security agent with the requesting peer.

19. The computer system of claim 11, wherein the system is configured by the program and the processor to:
authenticate the security agent with the requested peer.

20. The computer system of claim 11, wherein the generating of an encrypted request for peer-to-peer communications with a requested peer includes generating requests for a requesting peer to communicate with a number of requested peers and different encrypted session keys are distributed to the respective requested peers.

* * * * *